W. E. ANDREW.
SPRING STRUCTURE.
APPLICATION FILED APR. 12, 1913.
1,168,372.
Patented Jan. 18, 1916.
3 SHEETS—SHEET 2.
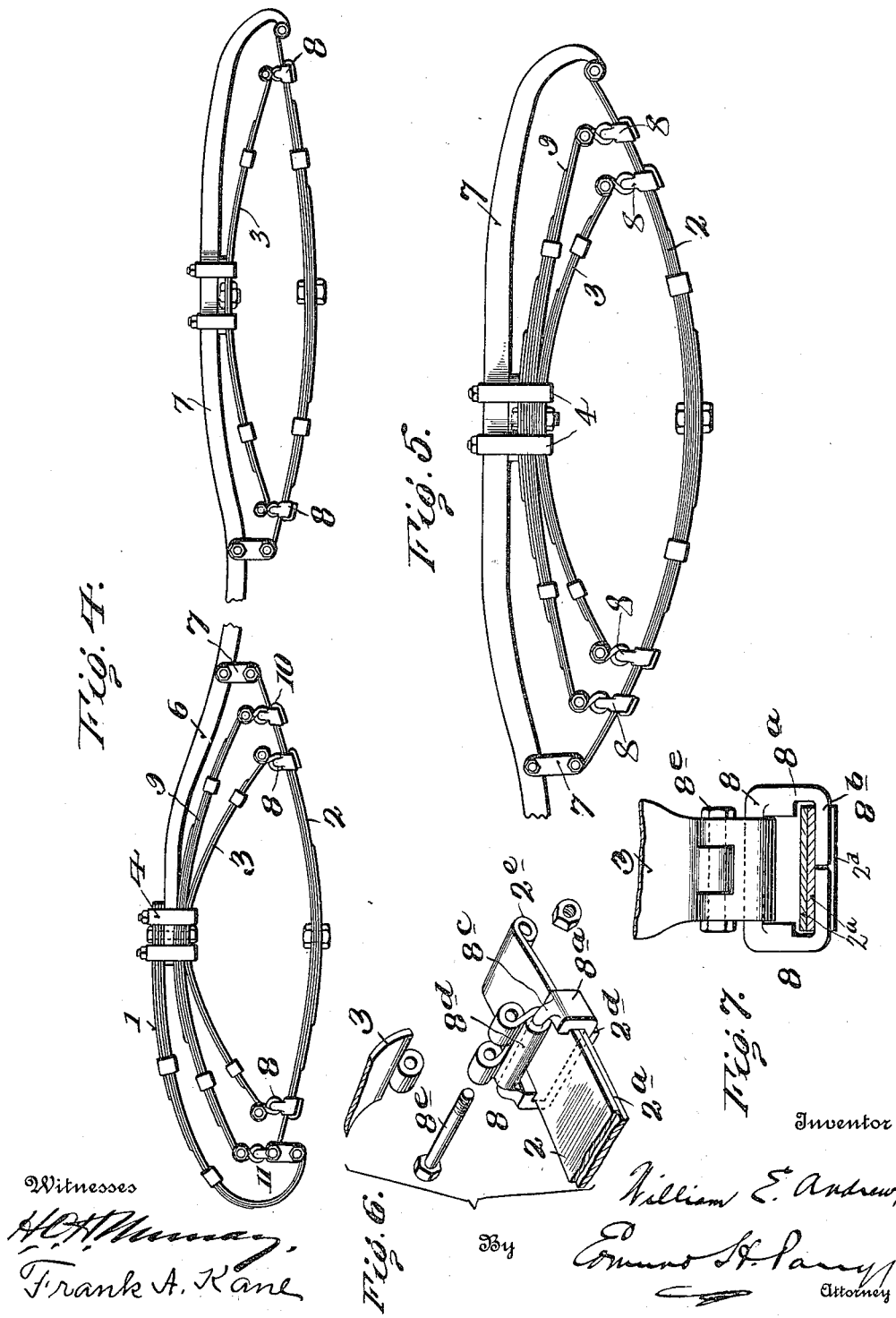

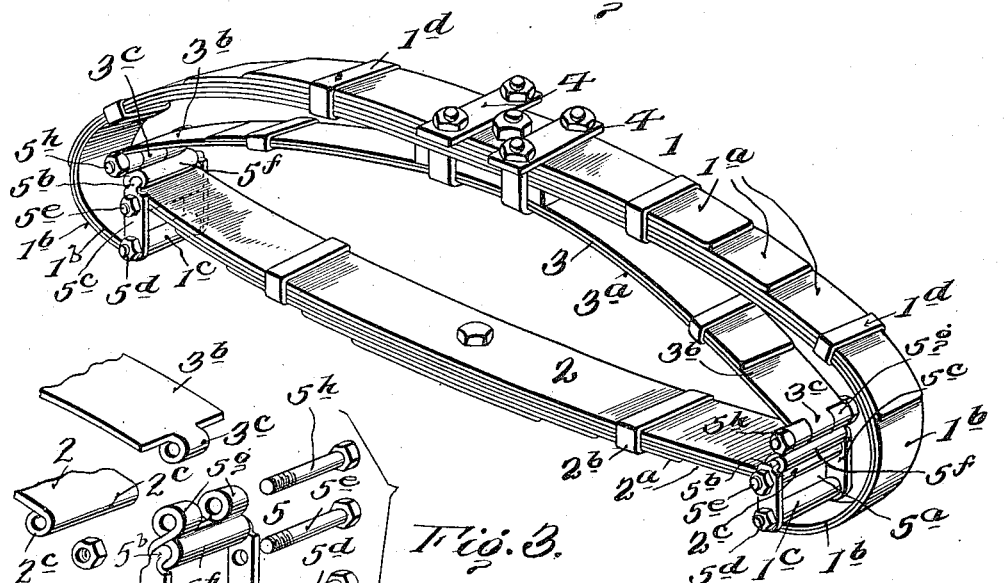
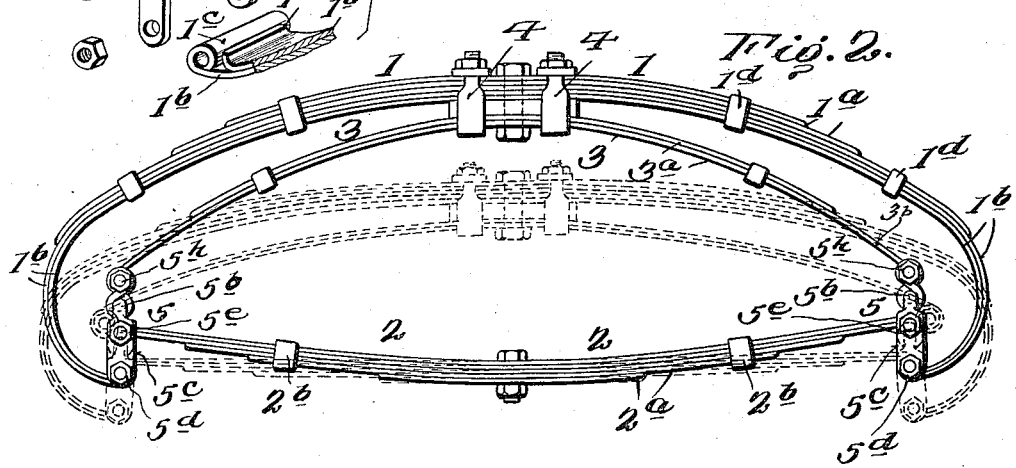

W. E. ANDREW.
SPRING STRUCTURE.
APPLICATION FILED APR. 12, 1913.
1,168,372.
Patented Jan. 18, 1916.
3 SHEETS—SHEET 3.
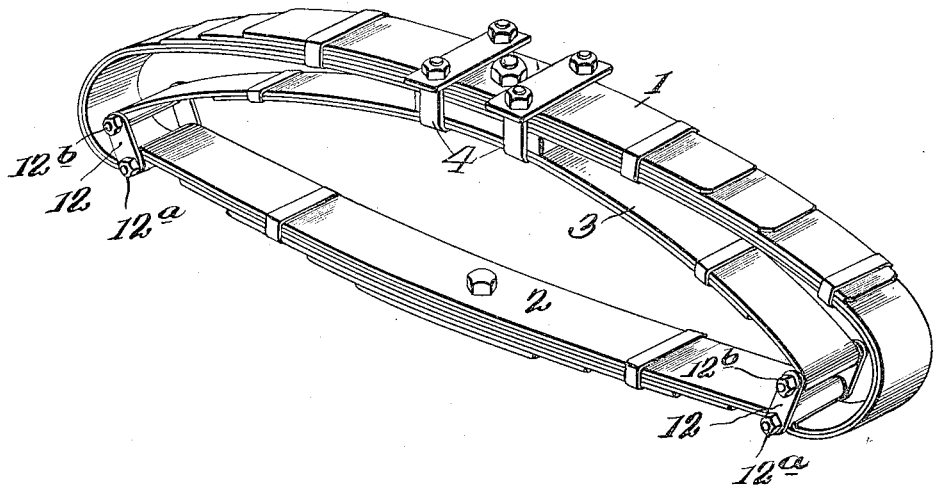
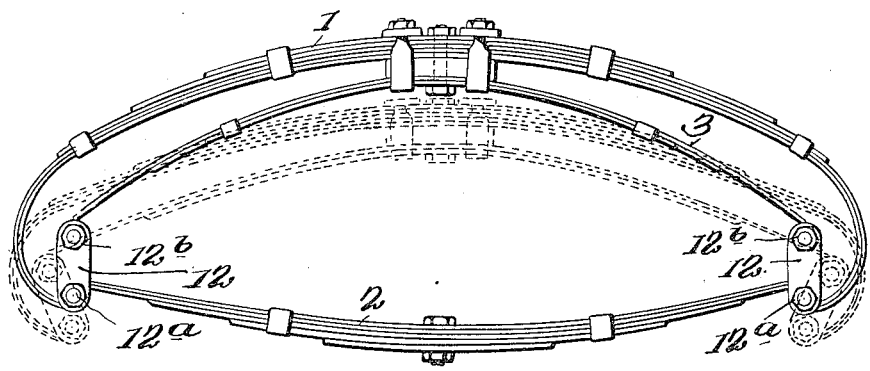

UNITED STATES PATENT OFFICE.

WILLIAM E. ANDREW, OF ATLANTIC HIGHLANDS, NEW JERSEY.

SPRING STRUCTURE.

1,168,372.  Specification of Letters Patent.  Patented Jan. 18, 1916.

Application filed April 12, 1913. Serial No. 760,637.

*To all whom it may concern:*

Be it known that I, WILLIAM E. ANDREW, a citizen of the United States, residing at Atlantic Highlands, in the county of Monmouth and State of New Jersey, have invented certain new and useful Improvements in Spring Structures, of which the following is a specification, reference being had therein to the accompanying drawing.

This invention relates to spring structures, such as those utilized in vehicles and the like.

In Patent No. 1,060,879, granted May 6th, 1913, I have disclosed an improved form of spring structure which is particularly well adapted for use in vehicles and which structure is designed to reduce to a minimum the effect on the vehicle-body of sudden jolts and jars. An important feature of that structure resides in the introduction of instrumentalities whereby the springs interposed between the vehicle-body and the axles are controlled in such manner that any sudden upward movement of the body (after the springs have been flexed) will be prevented or substantially so. By the employment of such a structure, the use of so-called "shock absorbers", extensively employed and the action of which is more or less uncertain, is obviated.

The subject-matter of the present case is, in the main, an improvement upon that disclosed in the aforementioned patent and which will, in practical use, possess the high degree of efficiency and durability asserted for my patented structure and which will obviate the necessity of constructing certain of the parts according to precise measurement as may in some instances be required in my said patented structure.

My said patented construction includes a plurality of springs, a link-connection operatively related to said springs and adapted to permit movement of one in relation to the other, and a spring-controlling device attached to one of the springs and adapted to have a downward pulling action thereon. In that instance, the connection comprises a link which includes a plurality of bearing-portions all integral with the body-portion of the link. I find in the manufacture of the structure that, at times, it is not always possible to form the spring-controlling device, without resort to accurate measurements, etc., so that, in the assemblage of the parts, it may readily and conveniently be connected to the link. Any inaccuracy of the link of said controlling-instrumentality tends to interfere with the proper aggroupment of certain other parts, and in consequence of this, certain strains are imposed upon the parts, during action of the spring-structure, which might reduce its efficiency. Therefore, in the present case, I have introduced a form of link-connection which renders unnecessary the exactness of dimensions and accurate fitting of the parts. To this end, in the preferred embodiment herein disclosed, said link-connection is constructed of a plurality of interrelated elements, whereby their action becomes more or less independent one of the other than may be possible in my said patented structure.

Other objects and advantages will be obvious from the disclosure hereinafter incorporated.

The invention resides particularly in the features of construction, combination of elements, and arrangement of parts, and in various novel aggroupments thereof, all as exemplified in the construction hereinafter set forth, and the scope of the application of which will be indicated in the claims hereto appended.

In order that this invention may be more clearly made comprehensible to those skilled in its related art, drawings illustrating some of the many possible utilizations of the same are appended hereto as a part of this disclosure, it being manifest that other possible utilizations and embodiments may be employed and that the underlying principles of my invention, as incorporated in such embodiments, fall within the spirit thereof and within the objects contemplated thereby.

In the accompanying drawings: Figure 1 is a view in perspective of my improved spring-structure; Fig. 2 is a view in elevation thereof, showing in full lines the position of the parts after they have acted, by rebound, from the normal position illustrated in Fig. 1; the view showing, in dotted lines, the position of the parts which they assume when the spring is flexed under the action of the load; Fig. 3 is a collective view, somewhat fragmentary, illustrating in detail the parts of the link-connection or shackle which I elect to employ in this particular embodiment; Fig. 4 is a similar view of a modification of my invention, the modification residing particularly in the form of link-connection between the parts; Fig. 5 is a similar view of the same embodiment but somewhat differently applied; Fig. 6 is a fragmentary, collective view of the form of link-connection which I elect to utilize in connection with the embodiment illustrated in Figs. 4 and 5; Fig. 7 is a fragmentary view, in sectional elevation, of said link-connection, with the parts secured together; Fig. 8 is a view in perspective of another modification, and showing the parts in the position they normally occupy; and Fig. 9 is a view in elevation showing, in full lines, the position of the parts they assume by rebound from the position indicated in dotted lines, and which latter position is that which the parts assume under an abnormal load condition.

In the several embodiments of my invention, it is to be understood that there will be a plurality of elements. Essentially, one of these will comprise a spring; another will be a spring-controlling or equalizing device preferably connecting with the spring and constantly under tension when in operative position; and still another will be a support or sustaining-instrumentality, and this may be either in the form of a spring, or in the form of a bar or arm, or of other appropriate form, according to the manner of utilizing my improved spring-structure, or according to its particular application to a vehicle.

Referring to the drawings and to the embodiment illustrated in Figs. 1 to 3, the numeral 1 designates the sustaining-instrumentality and in this instance is shown, by way of example, as a spring comprising a plurality of secondary leaves 1$^a$, preferably of different lengths, and a plurality of primary leaves 1$^b$ of approximately the same length—such arrangement of the primary leaves resulting in a reinforcement of one by the other. One of these leaves 1$^b$ is suitably formed at its ends with loops or eyes 1$^c$ for a purpose presently to be explained. Any preferred form of instrumentality for clamping the leaves together may be employed, and in this instance I have shown clips 1$^d$ for this purpose.

The spring-elements included in this structure are, in respect to the feature of the "reversed tension", similar in general form and operation to those disclosed in my aforementioned patent.

Underlying or overlying the aforementioned sustaining-instrumentality 1—as the case may be, according to the particular application of my improved spring-structure in the vehicle—is a spring-device 2, also preferably constructed of a plurality of leaves 2$^a$ operatively clamped together by clips 2$^b$, one of said leaves being bent at the ends to form loops or eyes 2$^c$—much in the same manner as the spring-sustaining instrumentality 1, already described.

Interposed between the sustaining-instrumentality aforementioned and the spring-device 2 is an equalizing or spring-controlling instrumentality 3 which, in the embodiment illustrated in Figs. 1 to 3, is secured to the spring-sustaining instrumentality 1 by one or more clips 4, preferably intermediate the ends of both the spring 1 and the equalizing-device 3. These clips may also serve as means of attachment of the spring-structure to the vehicle-body. This spring-device 3 is preferably constructed in much the same manner as I have already described with reference to the springs 1 and 3, and includes a plurality of leaves, one of which, 3$^b$, has its ends bent to form a loop 3$^c$, as well shown in Fig. 3. Either or both of the leaves may be constructed to include the reversed tension feature, aforementioned. It is to be understood, however, that neither of these leaves may, when assembled, be under tension; but the desired tension of the equalizer, as an entity, may be effected by bending it upwardly or downwardly—in this disclosure, it is illustrated as being bent upward—whereby it will, while in this bent position, be of substantially arched form, wherefore it is adapted to perform its recoil-controlling function in whatever position the vehicle may assume, whereby an easy and gradual upward movement of the structure supported by the spring will result when stresses are imposed upon the parts. By being thus under tension normally when in operative position, the equalizing-device normally operates to effect a downward pulling movement; that is to say, being constantly under tension when in its arched condition, it has a normal tendency to effect a downward pulling movement upon the sustaining-instrumentality whereby recoil of the vehicle-body and upward movement of the same may be controlled in any position which said body may assume.

The sustaining-spring 1, the spring-device 2, and the equalizing-device 3 may be operatively connected together; and in this embodiment, as shown in the drawings, a two-part link-device 5 may be used. This link-device may be constructed in various forms, and in Figs. 1 and 3 I have shown a preferred form. In Fig. 1, it is shown as including an inverted U-shaped element or shackle 5$^a$ having an integral bearing-portion 5$^b$ and two side portions 5$^c$ each provided with a plurality of bolt holes to receive bolts 5$^d$ and 5$^e$. Preferably and as shown, the bolt 5$^d$ constitutes a bearing for the looped end 1$^c$ of the sustaining-spring 1. The innermost of the leaves 1$^b$ may not encompass this bolt but, as shown in Fig. 1, extends up to and against the loop 1$^c$, and, as shown in Fig. 3, it may have an upturned end 1$^f$ to engage the loop 1$^e$ and have a slight movement thereon. The bolt 5$^e$ constitutes a bearing for the looped end 2$^c$ of the spring-device 2. Encompassing the bearing-portion 5$^b$ of the link-device 5 is a joining-element 5$^f$, provided with two bent ends or loops 5$^g$ adapted to encompass a bolt 5$^h$ which extends through and constitutes a bearing for the looped end 3$^c$ of the equalizing-spring 3.

In my aforementioned patented form of structure, the link-device constitutes a rocking-connection between the sustaining-spring, the spring-device and the equalizing-device, and functions to transmit motion from one or another of these three instrumentalities to two of them. In the present structure, however, the link-connection 5 being formed of a plurality of parts, functions quite differently, in that, in receiving motion from one of the instrumentalities, it does not transmit such motion to two of the others. On the contrary, it transmits motion only between the sustaining-spring 1 and the equalizing-device 3, or vice versa. Therefore, it has no direct tensioning effect on the spring-device 2. In consequence, this link-connection being without direct co-action between the spring-device 2 on the one part, and the sustaining-spring 1 and the equalizing-device 3 on the other, any stresses imposed upon the spring 1 or the equalizing-device 3 are not transmitted directly if at all to the spring-device 2, though it is to be understood that these three instrumentalities 1, 2 and 3 operate to sustain the load of the vehicle and also operate to prevent the same from any sudden movement in either direction due to any abnormal pressure being imposed upon the sustaining-spring, 1 in the downward direction, or upon the spring-device 2 in the upward direction. By reason of this feature of the structure, any unusual pressure imposed upon either the sustaining-instrumentality 1 or the spring-device 2 will not result in transmitting to the scroll part of the sustaining-instrumentality 1 any undue strain. It may be stated at this point that the innermost of the leaves 1$^b$ constitutes a reinforcing medium for the outermost of the leaves 1$^b$ and, to this end, is of substantially the same dimensions. Another feature of importance, due to this particular construction and arrangement of the parts, is that extreme accuracy in dimensioning the equalizing-device 3 is rendered unnecessary, since its length will predetermine the relative angle between the joining-element 5$^f$ and the shackle 5$^a$. Normally, the angle between these two will be approximately that disclosed in Fig. 1. This angle will, however, change to approximately that illustrated in dotted lines in Fig. 2 when stress is imposed upon the sustaining-instrumentality 1; and will then change to that illustrated in full lines in Fig. 2 when the parts move upward to prevent rapid rebound of the vehicle-body. This Fig. 2 illustrates the relative positions of the parts in dotted lines when they reach substantially their lowermost position, and in full lines, substantially their uppermost position.

In Figs. 4 to 7, a somewhat different embodiment and arrangement of the instrumentalities are disclosed. In this instance, the sustaining-spring 1 is of the so-called "three-quarter elliptical, scroll" type, and in this instance, has one end secured, as by the clips 4, to the side bar 6 of the vehicle-chassis, not shown. In this instance, also, the spring-device 2 is attached at one end, as by a swiveling-device 7, to the side bar 6, and at the other end to the sustaining-instrumentality 1 by means of the link-connection 11 in the same manner as described in connection with the embodiment of Fig. 1. Herein, in lieu of connecting the equalizing-device 3 to the link-connection 5, as heretofore described, it is attached at each end directly to the spring-device 2 by a shackle 8. This shackle includes a clip-portion 8$^a$ having its ends 8$^b$ arranged in horizontal alinement, as clearly shown in Fig. 7, to form a retaining support for the looped portion 2$^d$ of one of the leaves 2$^a$ of the spring-device 2, the other of the leaves 2$^a$ being also provided at its ends with a loop 2$^e$, as shown in Fig. 6, for a purpose presently to be explained. A bearing 8$^c$ of the shackle 8 has secured to it a joining-element 8$^d$ corresponding in form to the joining-element 5$^f$ in the form of device illustrated in Fig. 3 and to this is jointed, as by the bolt 8$^e$, the looped end of one of the leaves of the equalizing-device 3. As shown in Fig. 4, the equalizing-device 3 is clipped to the bar 6. Interposed between the equalizing-device 3 on the one part, and the sustaining-spring 1 and the bar 6 on the other, is a supplemental sustaining-instrumentality 9 which, in this instance, is in the form of a spring and, at one end, by a shackle 10—corresponding to that illustrated in Fig. 6—is attached to the spring-device 2 between the shackle 7 and the point of securement of the shackle 8. This spring 9 at its opposite end is connected to the primary sustaining-instrumentality 1 and the spring-device 2 by means of the link-connection 11 corresponding in form to that illustrated in Fig. 3. The form of structure shown at the right, in Fig. 4, corresponds, in general respects, to that illustrated in my aforementioned patent, except in so far as it employs the form of shackle illustrated herein in Fig. 6. The principal function of the secondary sustaining-spring 9 is to relieve the stresses that would ordinarily be carried by the spring-device 2, the equalizing-device 3, and the primary sustaining-instrumentality 1. In Fig. 5, a somewhat different arrangement of parts is included. In this instance, the spring-device 2 is secured at two points to the chassis-bar 6; the secondary sustaining spring 9 is secured at two points to the spring-device 2; and both the equalizing-device 3 and the secondary spring 9 are secured, intermediate of their ends, to the chassis-bar 6. By this arrangement, the downward as well as the longitudinal stresses are relieved.

The embodiment illustrated in Figs. 8 and 9 is subject-matter divided out of my application which eventuated in Patent No. 1,060,879. In this instance, the sustaining-instrumentality 1, the spring-device 2, and the equalizing-device 3 are connected by a shackle 12 which includes a bearing-element 12ᵃ to constitute a fulcrum for both the sustaining-instrumentality 1 and the spring-device 2, and a bearing-element 12ᵇ to form a fulcrum for the equalizing-device 3. In other words, in this instance, the springs 1 and 2 are mounted on the same axis 12ᵃ, while the equalizing-spring 3 is mounted on an independent axis 12ᵇ. Fig. 8 illustrates the parts in substantially their normal position unaffected by load or other conditions; whereas in Fig. 9, the parts are illustrated in dotted lines in the position they assume when the sustaining-instrumentality 1 is depressed under a load condition, and in full lines in the position these parts assume when they have moved to their extreme upper position during rebound from that illustrated in dotted lines.

While I have illustrated my invention as applied to certain forms of springs, it is manifest that the invention may be utilized in connection with any of the various types, not only for the full elliptical form, as illustrated in Fig. 1 and of the three-quarter elliptic as illustrated in Fig. 3, but in connection with half elliptics, etc.; and therein the same function will be subserved and the same results will be produced as already explained in connection with the forms of springs specifically described. In all of these instances, I prefer to construct one or more of the springs with the reverse-tension feature embodied to achieve the objects explained in connection therewith in my aforementioned patent.

It will now be perceived that I have devised a spring-structure which is well adapted to achieve the several objects and ends in view. The structure is simple and compact in form and is particularly well suited for all vehicles like automobiles, and the parts of which it is formed are so constructed as to permit of its application to existing forms of spring-structures.

It is to be understood that the language used in the following claims is intended to cover all of the generic and specific features of the invention which, as a matter of language, might be said to fall therebetween.

As many changes can be made in this construction and many apparently widely different embodiments of this invention can be made without departing from the scope thereof, it is intended that all matter contained in the foregoing description and shown in the accompanying drawings shall be interpreted as illustrative and not in a limiting sense.

What I claim and desire to secure by Letters Patent is:

1. A spring-structure for vehicles and the like including in combination, a supporting-member; a spring-member overlying and disposed in movable relation to said supporting-member; an intermediate resilient spring-controlling instrumentality connected to said spring-member and constantly under tension whereby recoil of the vehicle-body is controlled in any position it may assume and have a normal tendency to effect a downward pulling movement upon said spring-member, said controlling-instrumentality having a movement toward and away from said supporting-member; and a connecting-instrumentality to which the ends of said supporting-member, said spring-member, and said spring-controlling instrumentality are independently connected, and including a plurality of co-acting elements adapted to transmit motion between said supporting-member and said spring-member without imposing a strain upon said controlling-instrumentality.

2. A spring-structure for vehicles and the like including in combination, a sustaining-instrumentality, a spring-device, a spring-controlling instrumentality interposed between said sustaining-instrumentality and said spring-device, and a connecting-instrumentality to which the ends of the sustaining and controlling-instrumentalities and the spring-device are independently connected and including a shackle and a joining-element hingedly connected to said shackle, whereby stresses upon the spring-controlling instrumentality are taken up and not transmitted to the sustaining-instrumentality.

3. A spring-structure including in combination, a sustaining spring-instrumentality formed with a scroll; an equalizing-device attached to said spring-instrumentality; a spring-device arranged in juxtaposition to said equalizing-device; and a link-connection to which the ends of said elements are independently connected and including an inverted U-shaped shackle, a joining-element pivotally connected thereto, and means for attaching the sustaining-instrumentality, the spring-device and the equalizing-device thereto.

4. A spring-structure including in combination, a pair of springs extending longitudinally of and in the same vertical plane with each other, a spring-controlling device interposed between said springs and adapted to have a downward pulling action upon one of them and being, when in operative position, at all times under tension, and a link-connection operatively related to said springs and adapted to permit movement of one in relation to the other but operating to transmit stresses from one to the other, and including a shackle and a joining-element pivotally connected thereto.

5. A spring-structure including in combination, a plurality of springs extending longitudinally of each other and one overlying another; a spring-controlling device attached to the uppermost of said springs and at all times under tension having a normal tendency to effect a downward pulling action on said uppermost spring; and a link-connection mounted at the ends of said springs and controlling-device and including two independently rocking-elements, upon one of which said springs fulcrum coactively, and upon the other of which said controlling-device fulcrums for movement independent of said springs.

6. A spring-structure including in combination, a connection-device including two independently rocking elements pivotally connected for independent rocking movement one of the other; an upper spring connected to and fulcruming on one of said rocking-elements at its lower portion; a second spring connected to and fulcruming on the upper portion of said element, and an equalizing-device connected to and fulcruming on the other of said rocking-elements; said connection-device operating under the strain imposed on it by said upper spring to effect a tensioning of said second spring and a downward strain upon said upper spring, and also to permit movement of said springs independently of the movement of said equalizing-device; said equalizing-device being constantly under tension when in operative position and operating to effect a downward strain upon said upper spring.

7. A spring-structure including a sustaining-instrumentality comprising a plurality of primary and secondary leaves, a pair of leaves being of substantially the same dimensions whereby one of the pair operates to reinforce the other thereof; a spring-device operatively connected to said sustaining-instrumentality and including a plurality of leaves; an equalizing-device operatively connected to said sustaining-instrumentality and to said spring-device including a plurality of leaves constructed with reversed tension and normally operating to effect a downward strain upon the sustaining-instrumentality; and a connection-device attached to said sustaining-instrumentality, to said spring-device and to said equalizing-device and including a plurality of rocking-elements pivotally connected, one of said elements being approximately U-shaped and formed with a bearing-portion and to which element said sustaining-instrumentality and said spring-device are independently connected, the other of said rocking-elements encompassing said bearing-portion of the other element and to which said equalizing-device is connected and upon which it fulcrums.

8. A spring-structure including a sustaining-instrumentality; a spring-device; an equalizing-device interposed between said sustaining-instrumentality and said spring-device and attached to one of said elements; and a link-connection including two rocking-elements and provided with four fulcra; said equalizing-device being connected to the uppermost fulcrum, said sustaining-instrumentality being connected to the lowermost fulcrum, and said spring-device being connected to one of the intermediate fulcra, and said two elements being connected at the fourth fulcrum.

9. A spring-structure including a sustaining-instrumentality; a spring-device operatively connected thereto; an equalizing-device interposed between the sustaining-instrumentality and the spring-device and connected to the sustaining-instrumentality intermediate of its ends; and a connection-device including a plurality of fulcra; said sustaining-instrumentality and spring-device being connected to said connection device so that the spring device fulcrums thereon in close juxtaposition to the point of connection therewith of the sustaining instrumentality, and said equalizing-device operating on a fulcrum independent of said common fulcrum and disposed therebetween and the sustaining-instrumentality.

In testimony whereof I affix my signature in presence of two witnesses.

WILLIAM E. ANDREW.

Witnesses:
EDMUND H. PARRY,
A. M. PARKINS.

Copies of this patent may be obtained for five cents each, by addressing the "Commissioner of Patents, Washington, D. C."